No. 801,957.  
PATENTED OCT. 17, 1905.  
H. D. ZEHRBACH.  
CREAM SEPARATOR.  
APPLICATION FILED APR. 1, 1905.
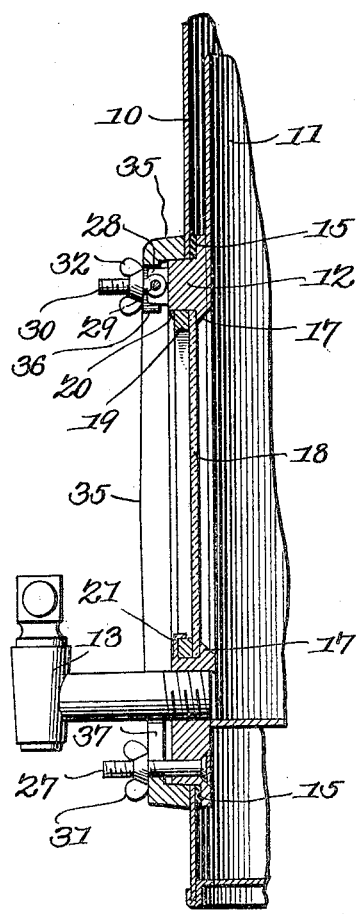
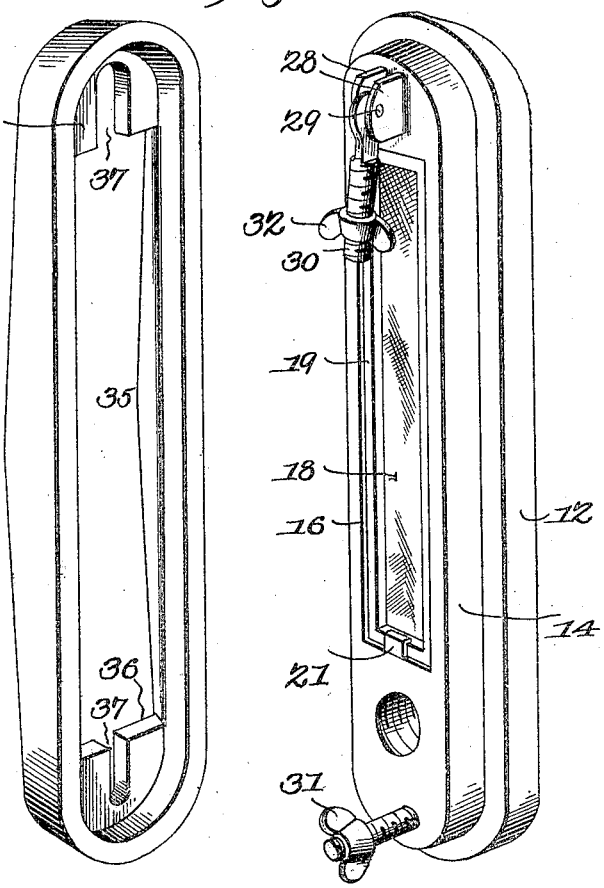
Witnesses  
Henry D. Zehrbach Inventor  
by C. A. Snow & Co.  
Attorneys

UNITED STATES PATENT OFFICE.

HENRY D. ZEHRBACH, OF BLUFFTON, OHIO.

CREAM-SEPARATOR.

No. 801,957.   Specification of Letters Patent.   Patented Oct. 17, 1905.

Application filed April 1, 1905. Serial No. 253,288.

*To all whom it may concern:*

Be it known that I, HENRY D. ZEHRBACH, a citizen of the United States, residing at Bluffton, in the county of Allen and State of Ohio, have invented a new and useful Cream-Separator, of which the following is a specification.

This invention relates to cream-separators of that class in which the whole milk is placed in a tank that is immersed or partly immersed in a body of water preferably contained within a second tank or vessel and the cream separating from the milk by gravity.

The principal object of the invention is to provide a novel means of simple construction for uniting the milk-containing vessel and the water vessel, so that the former may be readily removed for cleansing purposes.

A further object of the invention is to provide a securing means for connecting the two vessels in which it will be unnecessary to wholly detach the securing devices, so that there will be little or no danger of the securing means becoming lost or misplaced.

A still further object of the invention is to provide a novel means for holding the transparent sight-panel in position in such manner as to avoid the employment of cement and similar plastic materials ordinarily used for the purpose and to permit the ready renewal of the panel in case of accidental breakage.

With these and other objects in view, as will more fully hereinafter appear, the invention consists in certain novel features of construction and arrangement of parts hereinafter fully described, illustrated in the accompanying drawings, and particularly pointed out in the appended claims, it being understood that various changes in the form, proportions, size, and minor details of the structure may be made without departing from the spirit or sacrificing any of the advantages of the invention.

In the accompanying drawings, Figure 1 is a sectional elevation of the lower front portion of a cream-separator constructed in accordance with the invention. Fig. 2 is a detail perspective view of the plate carried by the milk vessel and the detachable clamping-ring, parts being shown separated in order to more clearly illustrate their construction.

Similar numerals of reference are employed to indicate corresponding parts throughout both figures of the drawings.

The water-containing vessel 10 is of any desired shape and size and arranged to contain one or more milk vessels 11.

To the front of the milk vessel 11 is secured a plate 12, that is provided near its lower end with a threaded opening for the reception of a faucet 13, through which the contents of the vessel may be drawn off. This plate is provided with a projecting portion 14, that extends through a vertically-elongated opening in the water-tank, and between the inner face of the water-tank and the face of the flange of the plate is a gasket 15, formed of rubber or other yieldable material in order to form a liquid-proof joint. The plate is provided with a vertical elongated opening 16, having a continuous inwardly-extending shoulder 17, on which is seated a transparent panel 18, the latter forming a sight-glass for determining the level of liquid in the inner vessel, and said transparent panel is confined in place by an elongated loop or link 19. In assembling these parts a plastic composition, such as putty, is first placed on the shoulder 17, and then the panel is pressed inward until it is seated firmly on the plastic material, all surplus material being expelled by exerting sufficient pressure on the panel. The metallic loop 19 is then forced into place and is held in position either by soldering it to the wall of the opening, as shown at 20, or by the employment of a bendable tongue 21, which may engage with the front of the loop and confine the latter in position, the tongue in some cases being deemed preferable for the reason that it permits of the more ready renewal of the glass panel if broken.

Projecting from the lower front portion of the plate 12 is a threaded stud 27, and the upper portion of said plate is provided with a pair of spaced pivot-lugs 28, carrying a pin 29, on which is pivoted a threaded bolt 30, and these threaded members 27 and 30 are provided, respectively, with thumb-nuts 31 and 32.

The portions thus far described are secured to the milk-containing vessel, and when placed in position within the water-tank the projecting portion of the plate and the threaded members and faucet will extend through the vertically-elongated opening in said tank. Fitting over the projecting portion of the plate 12 is a vertically-elongated clamping-ring 35, the inner face of which is pressed firmly into contact with the outer surface of the water-tank. The upper and lower portions of the link are partly closed by cross-plates 36, each of which is provided with a vertical slot 37, and when said ring is placed in position the lower slot will receive the threaded stud 27, while the upper slot receives the pivot-bolt 30. By tightening the thumb-nuts the clamping-ring may be firmly secured in place, and by compressing the gasket all leakage will be prevented.

When it is desired to remove the milk vessel, the upper clamping-nut 32 is turned and is swung down or falls by gravity, turning on its pivot-pin 29 until the bolt is wholly free from the upper slot. The lower nut 31 is then turned and the ring may then be moved outward at the top to clear the nut and thence slid downward until the lower slotted plate 36 is clear of the lower stud 27. The milk-containing vessel may then be moved inward within the water-tank until the projecting portions are wholly clear of the vertically-elongated opening in the water-tank and then the milk vessel may be lifted out and cleaned.

It will be observed that the two vessels may be separated without wholly detaching any of the securing devices with the exception of the vertically-elongated ring 35, this member, however, being of such size that it cannot be readily lost or misplaced. Where separable nuts or other securing devices are used, as in clamping devices of the ordinary type, these become lost and misplaced and prove a constant source of annoyance. A further advantage gained by the use of this securing device is the saving of time. With vessels having the ordinary clamping devices the nuts must be wholly removed before the vessel can be taken out, and these must be again refitted when the milk vessel is again placed in position.

It is obvious that various devices may be employed for the purpose of holding the link 19 in position without departing from the invention.

Having thus described the invention, what is claimed is—

1. In apparatus of the class described, the combination with the inner and outer vessels, the outer vessel being provided with a vertically-elongated opening, of a plate extending through said opening and provided with a transparent panel and a faucet, a detachable clamping-ring fitting over the projecting portion of the plate, the upper and lower ends of said ring being partly closed by transversely-extending plates, each of which is provided with a vertical slot opening into the ring, a threaded stud carried by one end of the plate and extending through one of the slots, a clamping-nut arranged on the stud, and a pivotally-mounted screw carried by the opposite end of the plate and free to fall by gravity against said plate when unfastened, said screw extending through the second slot, and a clamping-nut carried by said screw, the two clamping-nuts bearing against the end closing-plates of the ring.

2. In apparatus of the class described, the combination with the inner and outer vessels, of which the outer vessel is provided with a vertically-elongated opening, a plate secured to the inner vessel and extending through said opening, said plate having a vertically-elongated flanged opening, a transparent panel seated in the flange, a ring also arranged within the opening and bearing against the outer face of the transparent panel, and a locking means for holding said ring in position.

3. In apparatus of the class described, the combination with the inner and outer vessels, of which the outer vessel is provided with a vertically-elongated opening, a plate secured to the inner vessel and having a portion projecting through said opening, said plate having an elongated flanged opening, a transparent panel seated against the flange, a panel-clamping ring, and a bendable tongue carried by the plate and adapted to engage said panel-clamping ring.

In testimony that I claim the foregoing as my own I have hereto affixed my signature in the presence of two witnesses.

HENRY D. ZEHRBACH.

Witnesses:
  FRANK A. EATON,
  M. M. MURRAY.